United States Patent [19]

Onuki et al.

[11] Patent Number: 5,206,677

[45] Date of Patent: Apr. 27, 1993

[54] OPTICAL APPARATUS

[75] Inventors: Ichiro Onuki; Tatsuo Chigira, both of Kanagawa, Japan

[73] Assignee: Canon Kabushiki Kaisha, Tokyo, Japan

[21] Appl. No.: 609,838

[22] Filed: Nov. 6, 1990

[30] Foreign Application Priority Data

Nov. 8, 1989 [JP] Japan .................................. 1-288744

[51] Int. Cl.$^5$ ............................................. G03B 13/00
[52] U.S. Cl. ..................................................... 354/400
[58] Field of Search ................................ 354/400-409, 354/173.1

[56] References Cited

U.S. PATENT DOCUMENTS

| 4,894,676 | 1/1990 | Ohnuki et al. | 354/400 |
| 4,972,221 | 11/1990 | Ohnuki et al. | 354/402 |
| 4,974,003 | 11/1990 | Ohnuki et al. | 354/400 |

FOREIGN PATENT DOCUMENTS 59-26709 2/1984 Japan .

Primary Examiner—Michael L. Gellner
Assistant Examiner—David M. Gray
Attorney, Agent, or Firm—Robin, Blecker, Daley & Driscoll

[57] ABSTRACT

An optical apparatus comprises an optical system in which an amount of movement of an image forming plane varies according to the movement of a specific lens in the direction of an optical axis thereof, a driving unit for driving a focusing lens, a computing unit for obtaining sensitivity information concerned with an amount of movement of the image forming plane relative to a predetermined driving degree of the specific lens, a focus detector and a control unit for controlling a driving speed of the focusing lens as driven by the driving unit on the basis of focus information detected by the focus detector and sensitivity information obtained by the computing unit. The control unit causes the driving unit to drive the focusing lens at a first speed, then at a second speed which is lower than the first sped and then stops the focusing lens, the control unit varying the second speed according to the sensitivity information.

33 Claims, 9 Drawing Sheets

FIG.8
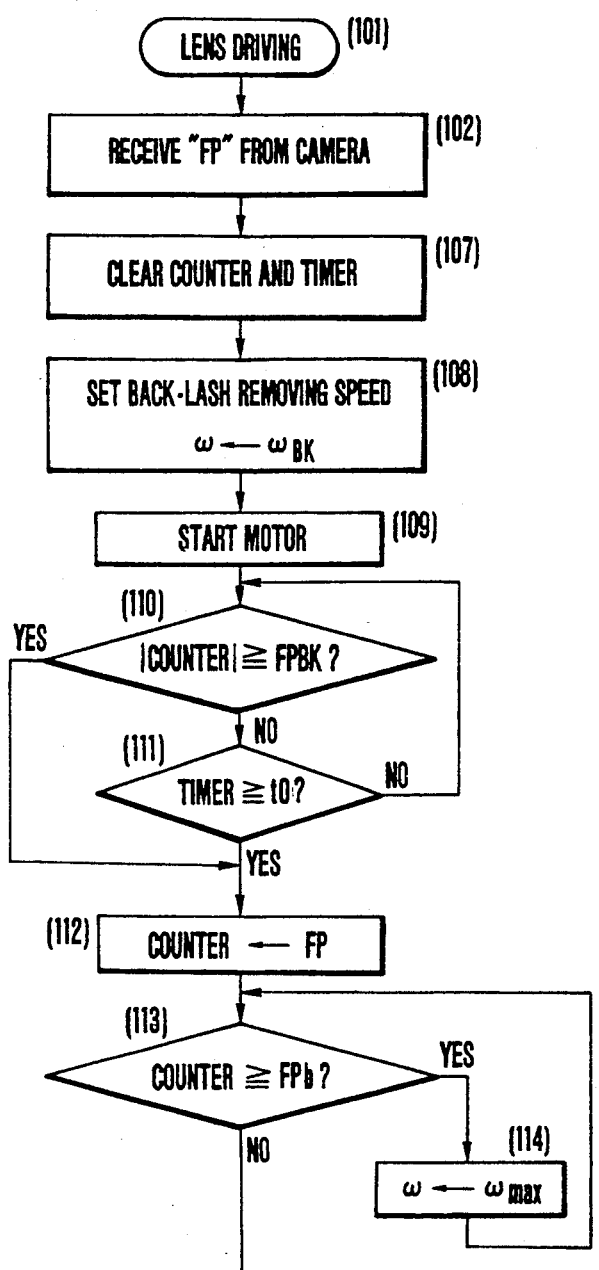
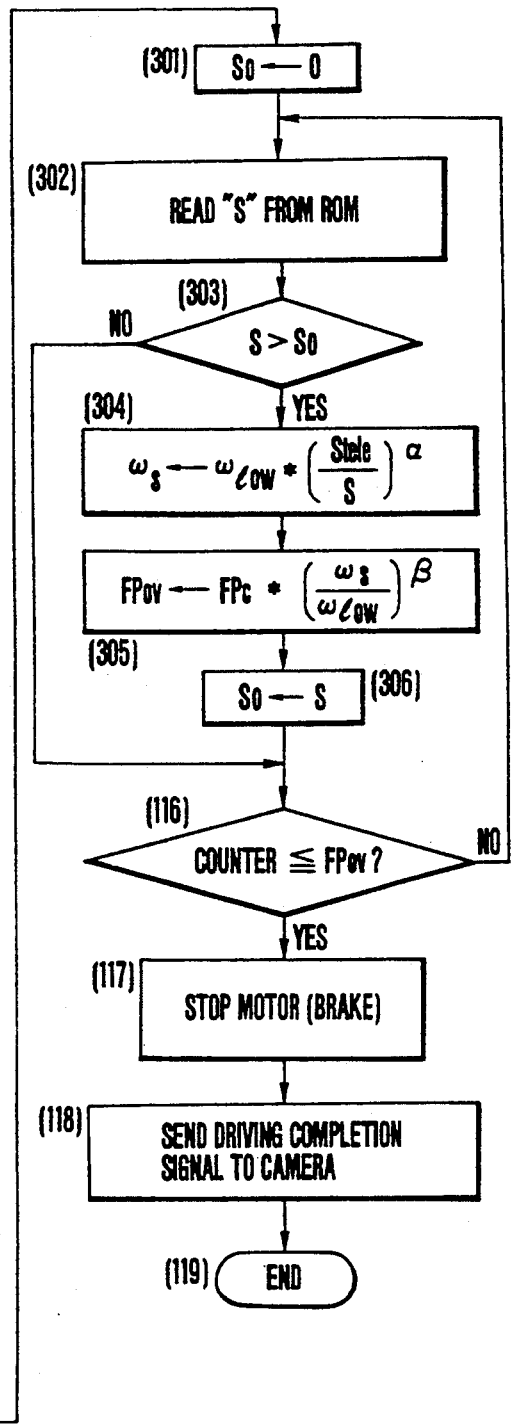

OPTICAL APPARATUS

BACKGROUND OF THE INVENTION

1. Field of the Invention

This invention relates to an optical apparatus having means for controlling the position shifting movement of a focusing lens.

2. Description of the Related Art

Many focusing lens driving devices for accurately bringing the position of the focusing lens of an automatic focusing camera to a stop within an in-focus range by driving the lens at a low speed when an out-of-focus degree of an image on a focal plane (hereinafter referred to as a defocus degree) is small and, in the event of a great defocus degree, by driving the lens first at a high speed until the lens position comes to a point which is at a given short distance from an in-focus point before the speed is switched to the low driving speed, have been disclosed, for example, in Japanese Laid-Open Patent Application Nos. SHO 56-94334, SHO 58-18611 and SHO 59-26709, U.S. Pat. No. 4,894,676, etc.

Roughly stated, the procedures taken according to the automatic focus adjusting method employed by these known devices are as follows:

1) The defocus degree DEF is detected by a focus detecting device.

2) The defocus degree DEF detected is converted into a focusing lens driving degree DL by using a degree of sensitivity S which is an amount of movement of the position of an image forming plane relative to a predetermined driving degree of the focusing lens. The conversion can be accomplished according to the following formula:

$$DL = DEF/S$$

In the case of a single lens which is arranged to be drawn out as a whole, the degree of sensitivity S can be considered to be nearly equal to "1". However, the degree of sensitivity S varies according to zooming, i.e., with the focal length in the case of a zoom lens and also varies with the focusing in the case of an inner focus type lens.

3) The focusing lens driving degree DL is converted into the rotating degree of an actuator used for driving the focusing lens. In this instance, the rotating degree is expressed in general by the number of pulses FP generated by an encoder which is arranged to monitor the rotating degree of the actuator. It is, therefore, expressed as follows:

$$FP = DL / PTH$$

wherein "PTH" represents the coefficient of "focusing lens driving degree vs. the number of pulses generated" determined by the lead of the helicoid screw of the focusing lens and the gear ratio of the gear train of a driving power transmission system.

4) The focus actuator is driven in a accelerating-and-decelerating pattern in accordance with the value of the pulse number FP outputted. The focusing lens is thus driven to reach an intended in-focus position.

5) The focus detection mentioned in Para. 1) above is again performed. If the defocus degree is found to be within a given in-focus range. The lens is regarded as in focus and the sequence of focusing steps are brought to an end. If not, the sequence of steps of Paragraphs 2) to 5) are continued.

In accordance with the above-stated method, the focusing lens driving degree DL is obtained from the defocus degree DEF by using the degree of sensitivity S. However, in driving the focusing lens, the driving pattern is irrelative to the degree of sensitivity S and is determined only by the focusing lens driving degree DL or the pulse number FP. This is further described as follows with a lens of 35-105 mm/F4 and PTH=0.01 taken up by way of example:

In the case of a zoom lens in general, the degree of sensitivity S varies in proportion to the square of the focal length f of the lens. Assuming that the degree of sensitivity S is at 0.5 when the focal length f is 35 mm, the degree of sensitivity S at f=105 mm is 4.5, which is a very high degree of sensitivity. The in-focus range (or width) is determined by the F number of the lens. However, in the case of the lens taken up by way of example, the F number is assumed to be unvarying over the whole area of the lens. Therefore, the in-focus width remains unchanged irrespectively of the focusing distance of the lens. In this case, the in-focus width is assumed to be plus or minus 0.1 mm (on the focal plane). Then, the value of the ratio between "the in-focus width and the focus shifting degree per pulse" becomes the smallest at the telephoto end position of the lens (f=105 mm). Therefore, the resolving power of the encoder, the gear ratio of the gear train, the focusing lens driving speed, i.e., the accelerating-and-decelerating pattern, etc., are arranged to give a prescribed lens stopping accuracy at the telephoto end of the lens.

With the lens arranged in this manner, a case where the defocus degree DEF is 9 mm at f=105 mm is compared with another case where the defocus degree DEF is 1 mm at f=35 mm as follows: In this instance, the focusing lens driving degree DL is 2 mm in both cases. Then, the number of driving pulses FP is 200 also in both cases. Therefore, in both cases, the lens is driven in the same accelerating-and-decelerating pattern. The driving time T and the stopping accuracy δFP are also the same in both cases. Let us here assume that the driving time T is 0.2 sec and the stopping accuracy δFP is plus or minus 1 pulse. Then, the stopping accuracy at f=105 mm on the focal plane is pulse or minus 45 μm, which is adequate for the in-focus width of plus or minus 0.1 mm, while the stopping accuracy at f=35 mm is plus or minus 5.0 μm, which can be considered to be a somewhat excessive accuracy. The accelerating-and-decelerating pattern obtained in this instance is shown in FIGS. 9 and 10 of the accompanying drawings.

In FIG. 9, the axis of abscissa shows the number of driving pulses and the axis of ordinate the driving speed. Accelerating-and-decelerating curves A1 to A5 show values obtained when the required driving degree FP is at a value FP1. The driving speed is at first accelerated to reach a maximum speed ωmax when the lens is driven to the point of a pulse number FPa. The speed comes to be decelerated at a point preceding a stopping target point by a number of pulses FPb. After that, the lens is driven at a low constant speed ωlow. The brake is applied at a point preceding the stopping target point by a number of pulses FPc. Then, the lens position comes to the target point after overrunning to a given degree. A curve shown by a one-dot chain line represents a lens of a heavy driving load. A curve shown by a two-dot chain line represents a lens of a light driving load. The fluctuations in the stopping accuracy due to the weight of the load become ±δFP.

Curves B1, B3, B4 and B5 are obtained in a case where a required driving degree FP2 is smaller than the required driving degree FP1. In this case, the driving speed is decelerated before the speed reaches the maximum speed ωmax. Then, the lens is driven at the low speed ωlow and, after that, the brake is applied to stop the lens. The stopping accuracy thus obtained is also ±δFP.

FIG. 10 shows the driving speed in relation to time. The axis of abscissa of FIG. 10 shows time from the commencement of lens driving. The axis of ordinate shows the lens driving speed. Curves C1 to C5 correspond to the curves A1 to A5 of FIG. 9, while curves D1 and D3 to D5 correspond to the curves B1 and B3 to B5 of FIG. 9.

During a period up to a point of time t0, the back-lash of the gear train is removed. During this period, a very small current is applied to the focusing lens driving motor for the purpose of canceling the backlash of the gear train between the motor and the helicoid screw. Therefore, several pulses might be received at a pulse encoder during this period. However, this causes no movement of the focusing lens. The pulses received during this period are, therefore, not counted. After that, the lens driving speed is accelerated to the maximum speed ωmax and decelerated to the constant speed ωlow before the brake is applied to stop the lens.

A feature of the method lies in the following point: While the area of the constant driving speed is not very long in terms of the driving pulses as viewed on the curve A4 in FIG. 9, it becomes much longer in terms of the time base as viewed on the curve C4 in FIG. 10. In other words, the constant speed driving time occupies a relatively large portion of the whole driving time. A driving time Td, therefore, does not much differ from a driving time Tc, as shown in FIG. 10, even if the number of driving pulses FP2 is one half of the number of driving pulses FP1 shown in FIG. 9.

As described in the foregoing, the accelerating-and-decelerating pattern is set in such a way as to have the driving speed appositely balanced with the lens stopping accuracy at the telephoto end (f=105 mm). Therefore, in a case where the lens is to be used at the wideangle end (f=35 mm), the stopping accuracy is higher than a necessary degree. On the other hand, in a case where the number of driving pulses is 200, for example, it corresponds only to a defocus degree of 2 mm at the wide-angle end on the focal plane while it corresponds to a defocus degree of 9 mm at the telephoto end. Therefore, if the lens is arranged to be driven for an unvarying length of time of 0.2 sec, the speed of a focus adjusting action on the image of a photographing object, as viewed within a view finder, would appear to be extremely slow at the wide-angle end.

When the lens is used on the side of the wide-angle end where the degree of sensitivity S is low, therefore, the operability of the automatic focusing device can be improved by varying the accelerating-and-decelerating pattern of the lens driving speed in such a way as to ease the stopping accuracy and to shorten the driving time.

To solve the above-stated problem, Japanese Laid-Open Patent Application No. SHO 58-194005 disclosed an arrangement whereby the shifting speed of the focused state of an image obtained on the focal plane can be made constant irrespectively of the focal length of a zoom lens by varying a focusing lens driving speed according to information on zooming. According to this arrangement, the lens driving speed is lowered at a fixed rate on the side of the telephoto end from the speed used on the side of the wide-angle end. Therefore, while it effectively renders the image shifting speed, uniform this effect is achieved at the expense of the focusing time required when a great defocus state occurs on the telephoto side. In other words, while it is possible to drive the lens at the maximum speed of the motor covering a fairly large part of the first half portion of the driving area for shortening the driving time when the lens must be driven to a great extent on the telephoto side, it is impossible to do so in accordance with the arrangement disclosed.

Another drawback of the arrangement lies in the following point: In a case where the zoom lens is of the so-called rear focusing type, the degree of sensitivity S varies not only with the focal length of the lens but also with the distance to the object to be photographed, i.e., with the position of the focusing lens of the zoom lens. However, in accordance with the arrangement, it is impossible to make any correction in this connection.

Meanwhile, Japanese Laid-Open Patent Application No. SHO 56-162728 disclosed a focusing lens speed adjusting method for a rear-focusing type zoom lens. In accordance with this method, the lens driving speed is changed according to the focus adjusting distance. An example of embodiment of this method is arranged to lower the lens driving speed on the wide-angle side which has a shorter focus adjusting distance However, as mentioned in the foregoing, the degree of sensitivity S varies approximately in proportion to the square of the zooming ratio of the zoom lens. Therefore, the requirement for stopping accuracy in terms of the rotation angle of the focusing actuator should be eased to a great degree on the wide-angle side. In view of this, the speed adjusting method disclosed cannot be considered to be always appropriate.

Further, in accordance with this method, the maximum speed is also lowered in lowering the lens driving speed. This, therefore, presents the same problem as in the case of the Japanese Laid-Open Patent Application No. SHO 58-194005 mentioned in the foregoing.

Japanese Laid-Open Patent Application No. SHO 62-215217 disclosed a method of varying the focusing lens driving speed according to the degree of sensitivity S in the event of a low contrast search. That method is, however, intended to prevent an in-focus point from being lost in sight in searching for the in-focus point by driving the lens at a lower speed when the defocus degree for the object is located outside the focus detecting range of the camera. Hence, the speed of the constant speed driving area immediately before stopping the lens is not changed. Referring to FIG. 11, this is further discussed as follows: In a case where the degree of sensitivity S is low, a focus detecting action is repeated by driving the lens at the maximum speed ωmax for the search as indicated by parts E1 to E5 in FIG. 11. Upon detection of the in-focus point, the lens driving speed is slowed down at the part E3. The lens is then driven at the constant driving speed at the part E4. After that, the brake is applied to bring the lens to a stop. In the case of a high sensitivity, the search driving is performed at a speed ω2; and, when the in-focus point is detected, the lens is driven at the constant low speed ωlow before bringing the lens to a stop. In both cases, the lens is driven at the speed ωlow when the brake is applied. Therefore, the stopping accuracy is plus or minus δFP in both cases. However, on the focal plane, the stopping accuracy of the former (in the case of the low sensitivity) is better than that of the latter to a degree more than necessary.

The examples of the prior art described above are thus considered to be incapable of performing optimum control over the whole lens driving range, because the balance between the driving time and the stopping accuracy is lost when the degree of sensitivity is changed by zooming, etc.

SUMMARY OF THE INVENTION

It is one aspect of this invention to provide an optical apparatus which is capable of performing lens driving control by keeping the lens driving time well balanced with lens stopping accuracy even in cases where the degree of sensitivity of the control varies to a great degree.

The above and other objects and features of the invention will become apparent from the following detailed description of embodiments thereof taken in conjunction with the accompanying drawings.

BRIEF DESCRIPTION OF THE DRAWINGS

FIG. 8 is a flow chart showing the lens driving control operation of a third embodiment of the invention.

DETAILED DESCRIPTION OF THE PREFERRED EMBODIMENT

Figure 3:
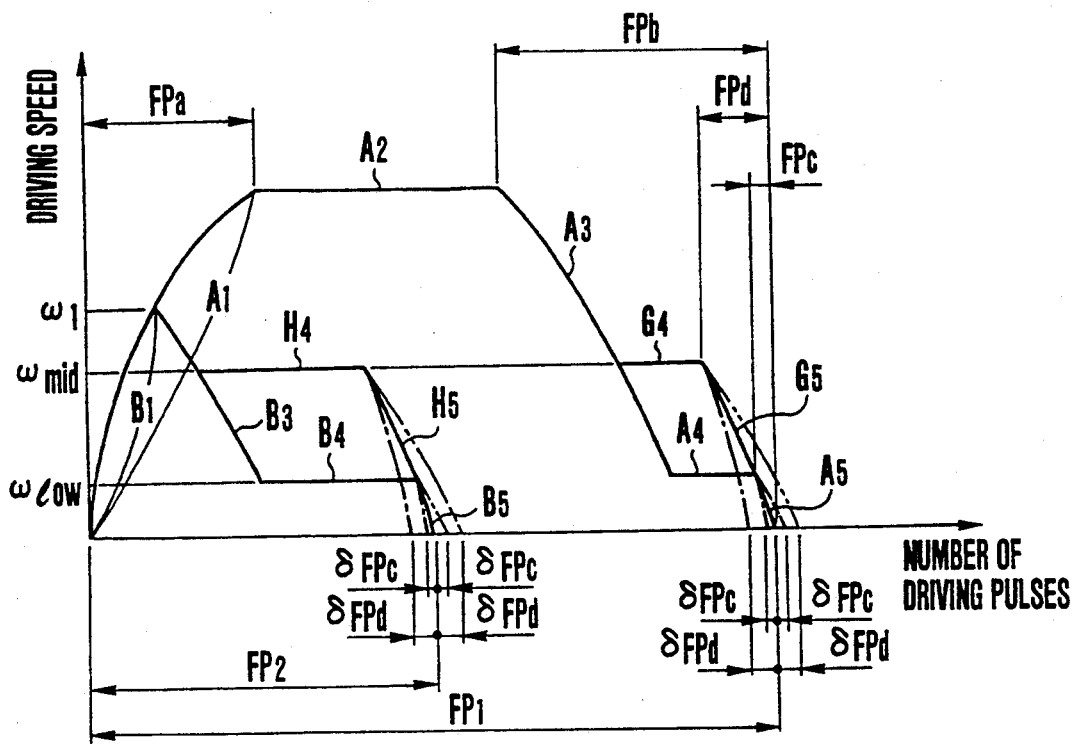
FIG. 3 is a graph showing the lens driving speed of the same embodiment in relation to the number of driving pulses.
Figure 4:
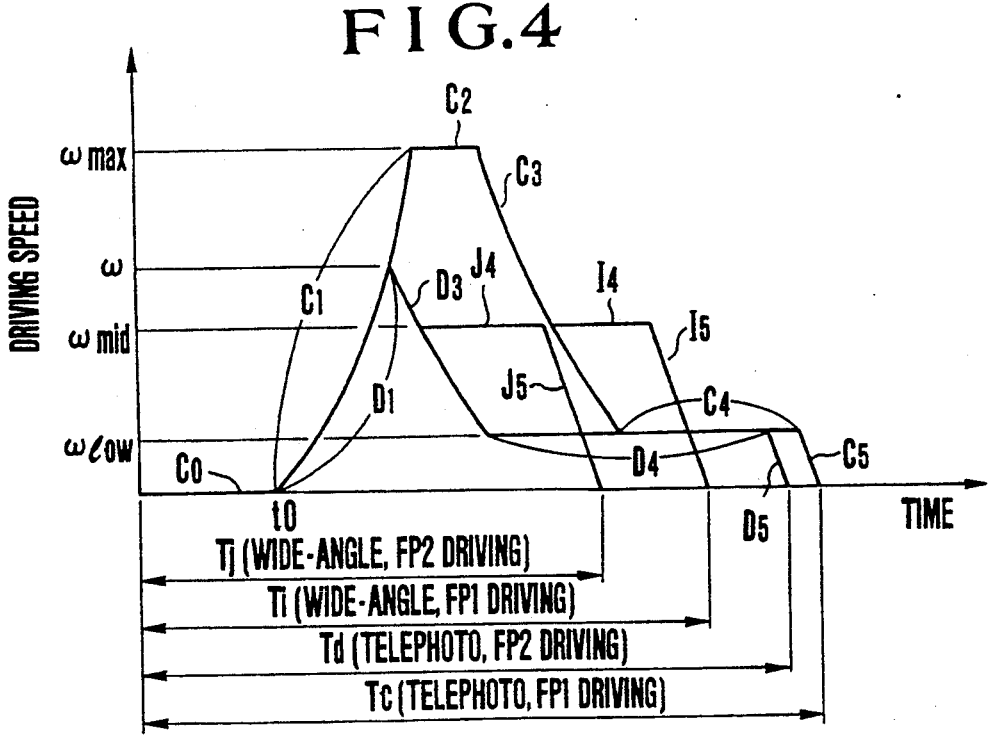
FIG. 4 is a graph showing also the lens driving speed in relation to time.
Figure 9:
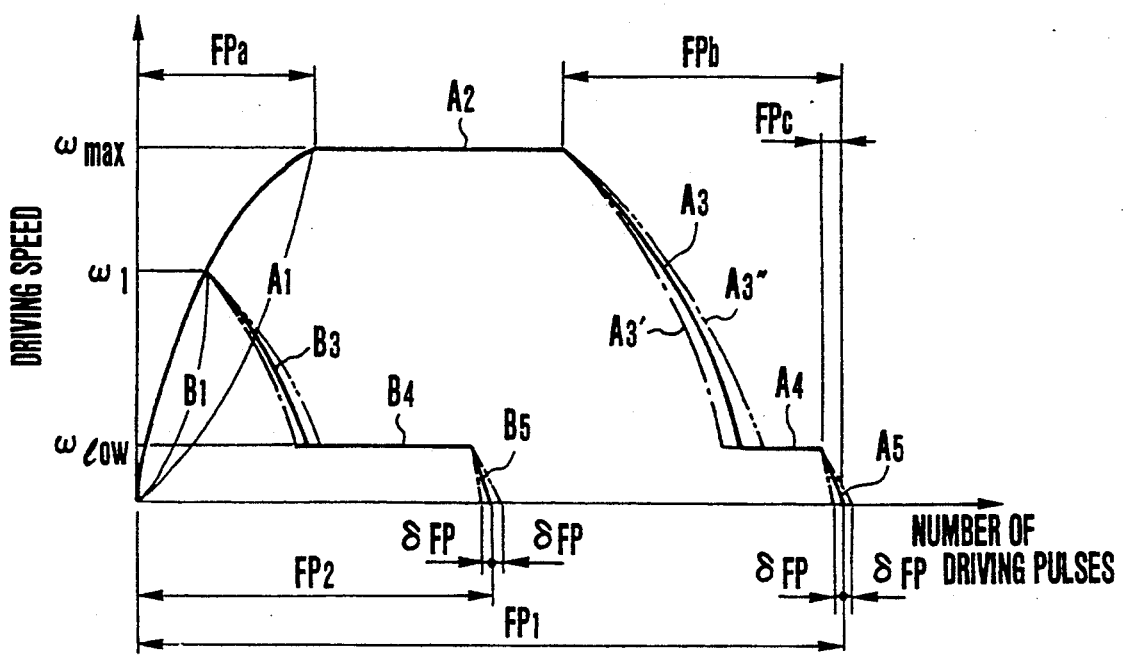
FIG. 9 is a graph showing a relation obtained by an example of the conventional method between the lens driving degree and the driving speed.

FIGS. 3 and 4 show the focusing lens driving control pattern of a first embodiment of this invention. In FIG. 3, the axis of abscissa shows the number of driving pulses and the axis of ordinate the focusing lens driving speed of the embodiment. The illustration corresponds to FIG. 9.

Referring to FIG. 3, in a case where a required driving degree FP1 on the telephoto side is the same as the conventional method as indicated by curves A1 to A5. However, when the lens is driven also to the same degree FP1 on the wide-angle side, it gives curves A1, A2, A3, G4 and G5, having the constant driving speed at ωmid instead of ωlow. In other words, when the lens driving speed reaches a maximum speed ωmax after the lens is driven to a degree corresponding to a number of pulses FPa, the lens is driven at the maximum speed ωmax and is then slowed down at a point which precedes the stopping target point by a distance corresponding to a number of driving pulses FPb. When the driving speed is thus lowered to the speed ωmid, the lens is controlled to be driven at the constant speed. Then, the brake is applied at a point preceding the stopping target point by a distance corresponding to a number of pulses FPd. The lens comes to a stop at the target point after overrunning to a given extent. In this instance (driving on the wide-angle side), the stopping accuracy is ±δFPd, which is poorer than a stopping accuracy ±δFPc obtainable on the telephoto side. However, since the degree of sensitivity S is low on the wide-angle side as mentioned in the foregoing, it gives a sufficient degree of stopping accuracy on the focal plane.

In a case where the required driving degree is FP2, curves B1, B3, B4 and B5 are obtained in the same manner as the conventional device on the telephoto side. On the wide-angle side, there obtain curves B1, B3, H4 and H5.

Figure 10:
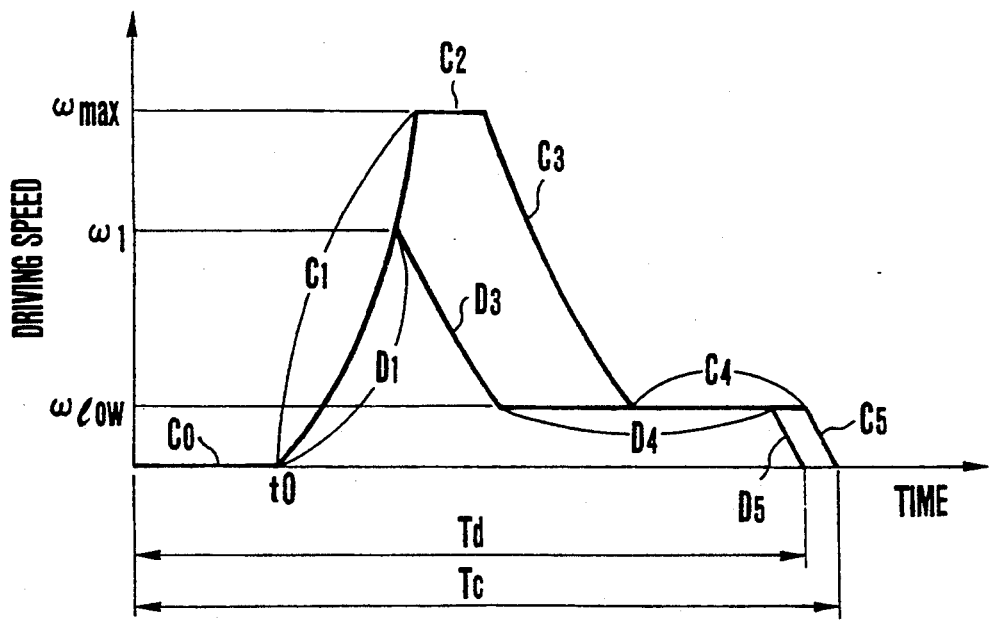
FIG. 10 is a graph showing the lens driving speed of the same example of the conventional method as in relation to time.
Figure 11:
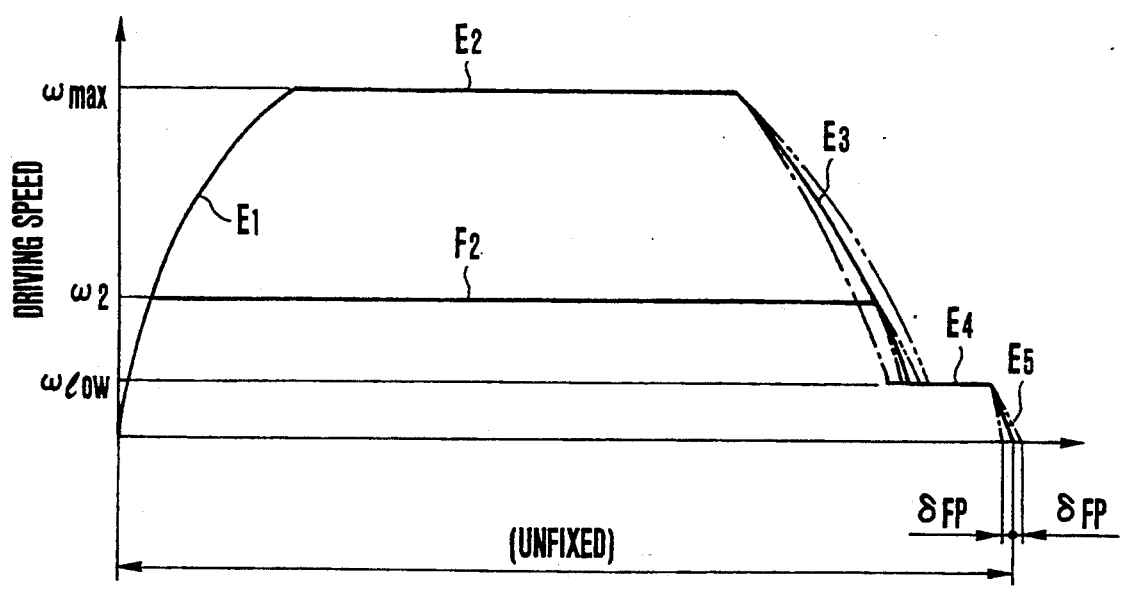
FIG. 11 is a graph showing the lens driving speed of another example of the conventional method as in relation to time.

FIG. 4 shows the lens driving pattern with the time base shown on the axis of abscissa. What is shown in FIG. 4 corresponds to FIG. 10 which shows by way of example the driving pattern of the conventional device. Driving patterns obtained by setting the driving degree on the telephoto side at FP1 and FP2 respectively consist of curves C0 to C5 and curves C0, D1, D3, D4 and D5. Their total driving periods of time become Tc and Td, which are the same as in the case of the example of the conventional device. Meanwhile, on the wide-angle side, driving patterns corresponding to the driving degrees FP1 and FP2 consist respectively of curves C0 to C3, 14 and 15 and curves C0, D1, D3, J4 and J5. Their total driving periods of time become Ti and Tj, which are much shorter than the total driving periods of time on the telephoto side. This results from the increase of the constant driving speed from the speed ωlow to the speed ωmid.

Figure 5:
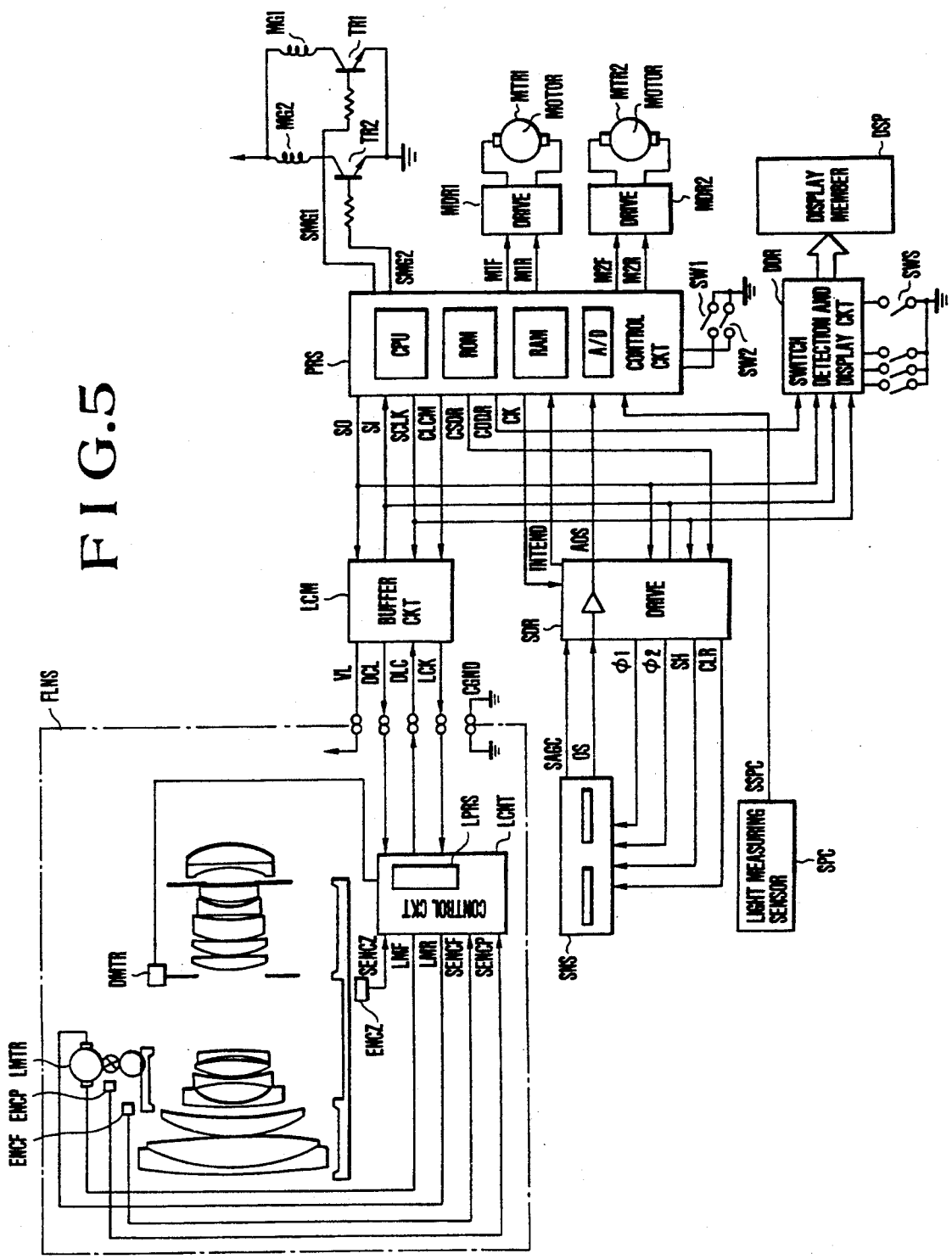
FIG. 5 is a circuit diagram showing a camera and a lens arranged in each embodiment of this invention.

FIG. 5 shows a camera and a lens provided with a device which is arranged as a first embodiment of this invention to cause the lens to be driven in the manner as shown in FIGS. 3 and 4. In FIG. 5, a reference symbol PRS denotes a control device (hereinafter referred to as a microcomputer) of the camera. The microcomputer PRS is a one-chip microcomputer including therein, for example, a CPU (central processing unit), a ROM, a RAM and an A/D (analog-to-digital) converter. In accordance with a sequence program which is stored in the ROM for the camera, the microcomputer PRS performs a series of control actions for the camera including an automatic exposure control function, an automatic focus detecting function, film winding, etc. For this purpose, the microcomputer PRS communicates with the lens and peripheral circuits disposed within the camera body by using synchronized communication signals SO, SI and SCLK and communication selection signals SLCM, CSDR and CDDR. These circuits and the lens are controlled through the communication.

The above-stated communication signal SO is a data signal output from the microcomputer PRS. The signal SI is a data signal supplied to the microcomputer PRS. The signal SCLK is a synchronizing (hereinafter abbreviated to sync) clock signal provided for the above-stated signals SO and SI.

A lens communication buffer circuit LCM is arranged to supply power to a power supply terminal for the lens while the camera is in action and also to serve as communication buffer between the camera and the lens when the selection signal CLCM from the microcomputer PRS is at a high potential level (hereinafter referred to as H level). When the microcomputer PRS sends out data as the signal SO in synchronism with the signal SCLK by raising the level of the signal CLCM to the H level, the buffer circuit LCM sends buffer signals LCK and DCL for the signals SCLM and SO to the lens via contacts provided between the camera (body) and the lens. At the same time, the circuit LCM produces a buffer signal SI for a signal DLC received from the lens. This signal SI is received as data relative to the lens by the microcomputer PRS in synchronism with the sync clock signal SCLK.

A driving circuit SDR is arranged to drive a line sensor device SNS which is composed of a CCD, etc., and is provided for focus detection. The circuit SDR is selected when the communication selection signal CSDR is at an H level. The microcomputer PRS then controls the circuit SDR by using the signals SO, SI and SCLK.

A signal CK is a clock signal provided for forming CCD driving clock signals $\phi1$ and $\phi2$. A signal INTEND is arranged to inform the microcomputer PRS of completion of an accumulating action.

A signal OS is a time serial image signal output from the line sensor device SNS in synchronism with the clock signals $\phi1$ and $\phi2$. The signal OS is arranged to be amplified into a signal AOS by an amplifier circuit disposed within the driving circuit SDR. The signal AOS thus obtained is supplied to the microcomputer PRS. The microcomputer PRS receives the signal AOS through an analog input terminal and then converts it into digital data by its internal A/D converting function. The digital data thus obtained is serially stored at the predetermined addresses of the RAM. Another output signal SAGC of the line sensor device SNS is output from a sensor provided within the device SNS for automatic gain control (hereinafter abbreviated to AGC). The signal SAGC is supplied to the driving circuit SDR to be used for controlling the accumulating action of the device SNS.

A light measuring sensor SPC is provided for exposure control and is arranged to receive light coming from an object through a photo-taking lens. A signal SSPC which is output from the light measuring sensor SPC is supplied to the analog input terminal of the microcomputer PRS. The signal SSPC is then converted into digital data to be used for automatic exposure control (abbreviated to AE) in accordance with a given program.

A switch detection and display circuit DDR is arranged to be selected when the communication selection signal CDDR of the microcomputer PRS is at an H level. The microcomputer PRS then controls the circuit DDR by using the signals SO, SI and SCLK. More specifically, the circuit DDR is arranged to switch a display made on a display member DSP of the camera over to another display on the basis of data sent from the microcomputer PRS and also to inform through communication the microcomputer PRS of the on-state or off-state of each of various operation members provided on the camera body.

Switches SW1 and SW2 are interlocked with a shutter release button which is not shown. The switch SW1 is arranged to turn on when the release button is pushed down to a first step (stroke) position and the switch SW2 to turn on when the release button is pushed further down to a second step position. The microcomputer PRS is arranged, as will be described later, to perform a light measuring action and an automatic focusing action when the switch SW1 turns on and to be triggered to perform exposure control and film winding when the switch SW2 turns on. The switch SW2 is connected to the interruption input terminal of the microcomputer PRS. An interruption is allowed in response to the turning-on of the switch SW2, even during execution of a program after the switch SW1 turns on. This enables the microcomputer PRS to immediately proceed to execute a given interruption program:

A motor MTR1 is provided for film feeding. A motor MTR 2 is provided for moving a mirror upward and downward and also for charging a shutter spring. These motors are controlled to rotate forward and backward by motor driving circuits MDR1 and MDR2. The microcomputer PRS supplies signals M1F, M1R, M2F and M2R for controlling the motors to the motor driving circuits MDR1 and MDR2. Magnets MG1 and MG2 are provided for allowing the leading and trailing shutter curtains to begin to travel respectively. The microcomputer PRS performs shutter control by causing currents to be supplied to these magnets MG1 and MG2 through signals SMG1 and SMG2 and amplifying transistors TR1 and TR2. The details of the switch detecting and display circuit DDR, the motor driving circuits MDR1 and MDR2 and the shutter control are omitted from the following description as they are not related directly to the present invention.

Within the lens (unit) FLMS, there is provided a lens driving control circuit LCNT. The circuit LCNT includes a microcomputer LPRS which is arranged to perform various control actions by exchanging various signals with the camera. A signal DCL which is supplied to the microcomputer LPRS in synchronism with the signal LCK is instruction data given from the camera to the lens FLNS. The action of the lens to be performed in response to the instruction is predetermined.

The microcomputer LPRS of the lens analyzes the instruction, in accordance with predetermined procedures and produces information on the focus adjustment, an aperture control action and the various operating states (such as how much the focusing optical system has acted; by how many steps the aperture is stopped down; etc.) of the lens and parameters (such as a full-open F number, the focal length, the coefficient of a defocus degree in relation to a lens drawing-out degree, etc.).

In the case of this specific embodiment, the invention is applied to a zoom lens. When an instruction is given to the lens (unit) to make focus adjustment, a focus adjusting motor LMTR is driven by means of signals LMF and LMR to adjust the focus by moving the optical system in the direction of an optical axis in accordance with information on a driving degree and the driving direction received along with the instruction from the camera. The moving degree of the optical system is monitored through a pulse signal SENCP of an encoder circuit ENCP by counting the pulses with a counter which is disposed within the lens driving control circuit LCNT. Upon completion of a given degree of movement, the circuit LCNT controls the motor LMTR by controlling the signals LMF and LMR. The details of arrangement of the circuit LCNT will be described later.

After receipt of the instruction for focus adjustment from the camera, therefore, the microcomputer PRS which is disposed within the camera body is not required to do anything relative to lens driving at all until completion of the lens driving action. Further, the lens is arranged to send, as necessary, the contents of the abovestated counter to the camera. In a case where an instruction is received from the camera to control the aperture, a known stepping motor DMTR is driven to operate an iris in accordance with information which is received along with the instruction concerning the number of steps by which the aperture is to be stopped down.

An encoder circuit ENCZ belongs to a zoom optical system and is arranged to produce a signal SENCZ. The microcomputer LPRS detects a zooming position by receiving the signal SENCZ from the encoder circuit ENCZ. Another encoder circuit ENCF belongs to the focusing optical system and is arranged to produce a signal SENCF. The microcomputer LPRS detects the position of the focusing lens by receiving the signal SENCF from the circuit ENCF.

The microcomputer LPRS stores therein parameters for the zoom position and the focusing lens position. On request from the microcomputer PRS disposed on the side of the camera body, an applicable parameter corresponding to the current position is sent out to the camera body.

Figure 6:
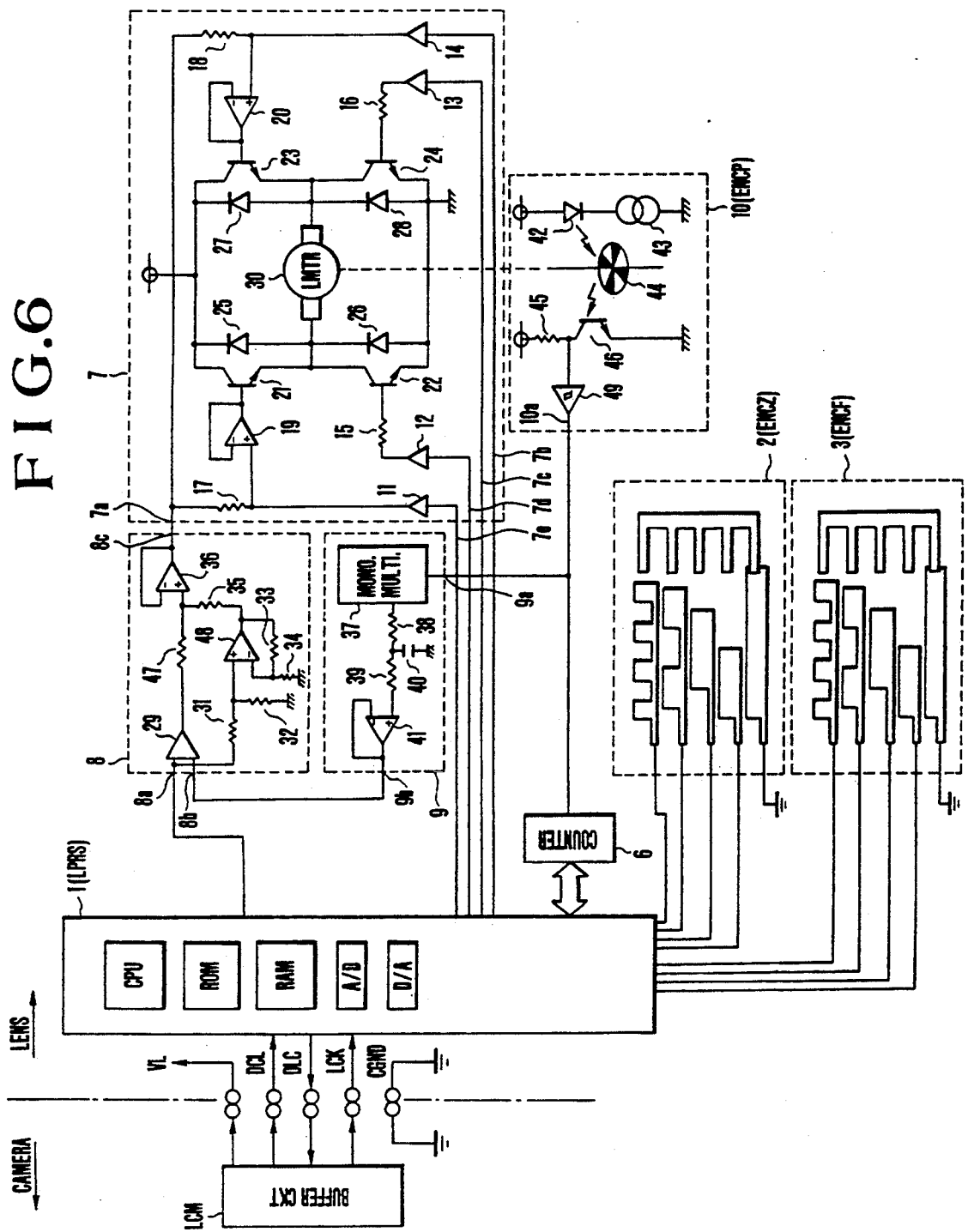
FIG. 6 is a circuit diagram showing the details of the internal arrangement of the lens shown in FIG. 5.

FIG. 6 shows the details of the lens driving control circuit LCNT, etc. included in the lens FLNS. In FIG. 6, a reference numeral 1 denotes a control device which is composed of a microcomputer and corresponds to the microcomputer LPRS of FIG. 5. Like the microcomputer PRS disposed within the camera body, the control device 1 includes therein a CPU, a ROM, a RAM, an A/D conversion circuit, a D/A (digital-to-analog) conversion circuit, etc.. The control device 1 (hereinafter referred to as the microcomputer LPRS, like in the case of FIG. 5) performs driving control over the focusing lens driving motor LMTR and the iris-driving stepping motor DMTR in accordance with a sequence program stored in the ROM.

Further, a lens driving degree computed by the microcomputer PRS within the camera body is supplied via the buffer circuit LCM to the microcomputer LPRS. Then a motor driving signal and speed data are supplied to a motor driving circuit 7 and a constant speed control circuit 8 which will be described later herein.

A reference numeral 2 denotes an encoder circuit which belongs to the zoom optical system and corresponds to the circuit ENCZ of FIG. 5. The encoder 2 is arranged to obtain four-bit data as information on a zoom position by moving a brush on a pattern in association with the movement of the zoom optical system. The data thus obtained is supplied to the microcomputer LPRS.

A numeral 3 denotes an encoder circuit which belongs to the focusing optical system and corresponds to the encoder ENCF of FIG. 5. The encoder 2 obtains fourbit data as information on the position of the focusing lens. The data is supplied to the microcomputer LPRS.

A motor driving circuit 7 is arranged to drive the focusing-lens driving motor 30 (LMTR of FIG. 5). A constant speed control circuit 8 is arranged to drive the motor LMTR to rotate at a constant speed. A pulse detecting circuit 10 (corresponding to the encoder circuit ENCP of FIG. 5) is arranged to produce pulses at a frequency which is proportional to the rotating speed of the motor LMTR. A frequency-to-voltage (hereinafter abbreviated to f/v) conversion circuit 9 is arranged to produce a voltage corresponding to the frequency of the pulses output from the pulse detecting circuit 10. A down counter 6 is arranged to be set by the the microcomputer LPRS at a given counter value (a number of pulses corresponding to a defocus degree and computed by the microcomputer PRS within the camera body). Upon receipt of the pulse signal of the pulse detecting circuit 10, the down counter 6 counts down the counter value. The counter 6 supplies the microcomputer LPRS with information on the counter value indicating how far the focusing lens has moved in the direction of the optical axis (i.e., indicating a remaining lens moving distance to a target position).

Further, the motor driving circuit 7 includes second to fifth input terminals 7b, 7c, 7d and 7e which are connected to the microcomputer LPRS. The circuit 7 is thus arranged to issue instructions for the normal or reverse rotation, brake application and opening the terminal of the motor LMTR when digital signals of high (H) and low (L) levels are supplied to these input terminals 7b, 7c, 7d and 7e. Further, a voltage output of the constant speed control circuit 8 is arranged to be supplied to the first input terminal 7a. By this, a voltage which is about equal to the input voltage is applied to the motor LMTR. The motor LMTR then begins to move in a given direction and comes to a stop according to the input receiving states of the second to fifth input terminals.

The following describes the arrangement of each of the circuit blocks shown in FIG. 6:

In the motor driving circuit 7, first to fourth transistors 21, 22, 23 and 24 form a transistor bridge and are connected to the motor LMTR. First and second buffers 19 and 20 are connected to the bases of the first and third transistors 21 and 23. The input terminals of the first and second buffers 19 and 20 are connected via resistors 17 and 18 to the output terminal 8c of the constant speed control circuit 8 respectively. Further, the input terminals of the first and second buffers 19 and 20 are connected respectively via the third and fourth buffers 11 and 14 to the microcomputer LPRS. Each of the third and fourth buffers 11 and 14 has its output stage arranged to act as an open collector. Therefore, when the level of the second input terminal 7e of the motor driving circuit 7 connected to the third buffer 11 becomes high (H), a voltage output from the output terminal 8 is applied as it is to the input terminal of the first buffer 19. Further, when the level of the fifth input terminal 7b which is connected to the fourth buffer 14 becomes high, a voltage output from the output terminal 8c is likewise applied to the input terminal of the second buffer 20. Further, all combinations of the states of the second to fifth input terminals 7b to 7e of the motor control circuit 7 that are not included in the following table are inhibited. The combinations shown in the table bring about the following states of the motor LMTR:

TABLE

| 7b | 7c | 7d | 7e | Motor LMTR |
|---|---|---|---|---|
| H | L | H | L | normal rotation |
| L | H | L | H | reverse rotation |
| L | H | H | L | brake |

TABLE-continued

| 7b | 7c | 7d | 7e | Motor LMTR |
|---|---|---|---|---|
| L | L | L | L | motor terminals opened |

In cases where the motor LMTR is in the normal rotating state or in the reverse rotating state, the voltage output of the constant speed control circuit 8 is applied between the terminals. Further, the motor driving circuit 7 includes diodes 25, 26 and 27.

In the constant speed control circuit 8, a differential amplifier 29 is arranged to obtain a difference between a voltage supplied to a first input terminal 8a and a voltage supplied to a second input terminal 8b. An operational amplifier 48 is arranged to amplify the voltage supplied to the first input terminal 8a at a magnifying rate determined by resistors 31 to 34. The output of the differential amplifier 29 and that of the operational amplifier 48 are supplied to a buffer 36 via resistors 47 and 35 respectively. With the constant speed control circuit 8 arranged in this manner, a voltage corresponding to a value obtained by multiplying a difference between a designated speed and an actual speed by a given coefficient is superposed on a voltage which corresponds to a rotational frequency designated by the microcomputer LPRS and is a signal converted into an analog value by D/A conversion carried out within the microcomputer LPRS. A voltage thus obtained is output from the output terminal 8c of the circuit 8.

The f/v conversion circuit 9 includes a filter circuit which consists of a monostable multivibrator 37, resistors 38 and 39 and a capacitor 40 and a circuit which consists of a buffer 41 and is arranged in a known manner. The circuit 9 is thus arranged to output from its output terminal 9b a voltage which is nearly proportional to the frequency of pulses supplied to the multivibrator 37.

The pulse detecting circuit 10 (ENCP) includes a photo reflector and a pulse disc 44 and is arranged in a known manner. The pulse disc 44 has reflection and nonreflection planes alternately arranged on its surface and rotates in synchronism with the rotation of the motor LMTR. The circuit 10 also includes a light emitting diode 42 which is arranged to be driven by a constant current circuit 43. The collector of a photo transistor 46 is connected to the power source via a resistor 45 and is connected also to the input terminal of a Schmitt trigger circuit 49. When the light of the light emitting diode 42 is reflected by the reflecting plane of the pulse disc 44 and comes to the photo transistor 46, the output level of the pulse detecting circuit 10 becomes high. The output level of the circuit 10 becomes low when the light of the light emitting diode 42 is absorbed by the non-reflection plane of the pulse disc 44. When the pulse disc 44 rotates in synchronism with the rotation of the motor LMTR, the pulse detecting circuit 10 produces pulses of a frequency which is proportional to the rotating speed of the motor LMTR.

The lens driving control device LCNT which is arranged in this manner causes the focusing lens to move in the direction of the optical axis by controlling the rotation of the motor LMTR as shown in FIG. 3.

Figure 2:
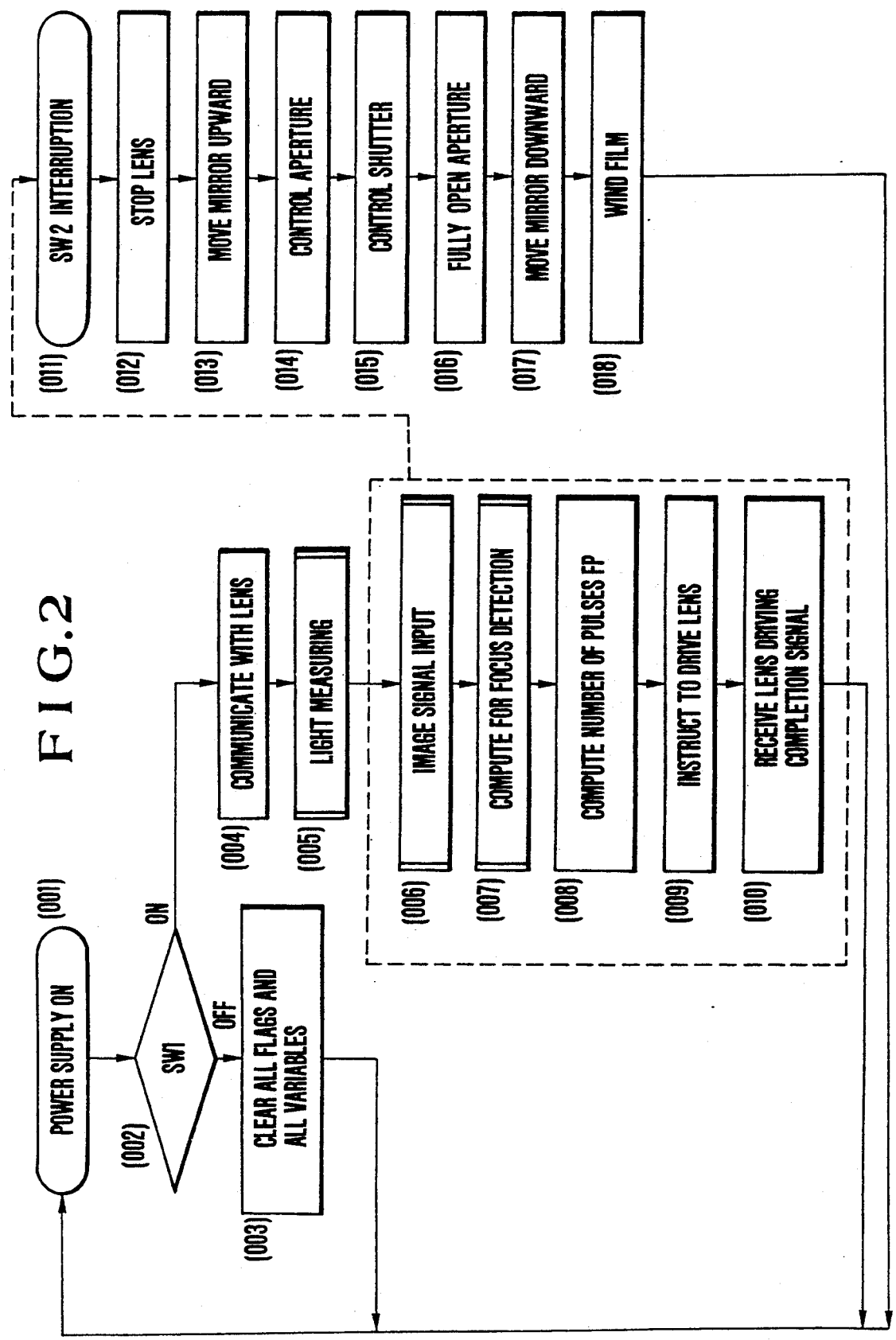
FIG. 2 is a flow chart showing the lens driving control operation of the same embodiment.

The focus detecting and lens driving actions of this embodiment are performed as described below with reference to FIGS. 1 and 2 which are flow charts:

FIG. 2 shows in a flow chart a series of actions of the camera. When a power supply switch which is not shown is turned on, the power begins to be supplied to the microcomputer PRS. The microcomputer PRS then begins to execute the sequence program stored in the ROM.

At a step 001: The execution of the program begins with the power supply switch turned on as mentioned above. At a step 002: A check is made for the state of the switch SW1 which is arranged to turn on when the shutter release button is pushed down to its first stroke position. If the switch SW1 is found to be in an offstate, state, the flow of the program comes to a step 003 to clear all the flags and variables set at the RAM within the microcomputer PRS to initialize them. These steps 002 and 003 are repeated until the switch SW1 turns on or the power supply switch is turned off.

If the switch SW1 is found to be in an on-state at the step 002, the flow comes to a step 004. At the step 004: Communication is first conducted with the microcomputer LPRS disposed within the lens (unit) FLNS to receive lens data which is necessary for focus detection and light measurement and is stored in the ROM of the microcomputer LPRS. At a step 005: A "light measuring" subroutine which is necessary for exposure control is executed. The microcomputer PRS receives, at its analog input terminal, the signal SSPC which is output from the light measuring sensor SPC shown in FIG. 5. The signal SSPC is converted into a digital from to obtain a digital measured value of light. Optimum shutter-control and aperture-control values are computed from the digital measured light value. These computed values are stored at applicable addresses within the microcomputer PRS. At the time of a shutter release operation, the shutter and the aperture are controlled on the basis of these values.

At a step 006: An "image signal input" subroutine is executed. At a step 007: After the step 006, the defocus degree DEF of the photo-taking lens is computed on the basis of the image signal received. The subroutines of these steps 005, 006 and 007 are well known. Therefore, the details of them are omitted from description. At a step 008: The number of lens driving pulses FP is computed according to the formulas DL=DEF / S and FP=DL / PTH mentioned in the foregoing description of "Background of the Invention". At a step 009: Information on the above-stated number of pulses FP is transmitted to the lens along with an instruction for starting lens driving. Then, in accordance with a given program stored in the microcomputer LPRS, the lens (unit) FLNS controls and drives the focusing lens to shift it to a degree corresponding to the number of pulses (or driving degree) FP. After that, a lens driving completion signal is sent to the camera body. Step 010: The lens driving completion signal is received on the side of the camera body. One cycle of the focus adjusting action is completed by these steps 004 to 010. Then, the flow comes back to the step 002 to perform a next cycle of the focus adjusting action.

In a case where the flow is interrupted by a shutter release operation during the process of executing the above-stated steps 006 to 010 which are encompassed with a broken line in FIG. 2, the embodiment operates as follows: As mentioned in the foregoing, the switch SW2 is connected to the interruption input terminal of the microcomputer PRS. When the switch SW2 turns on, the interrupting function of the embodiment enables the flow of the program to come to a step 011 from any of the above-stated steps even while the step is being executed.

In the event of the "SW2 interruption" of the step 011 during the process of any of the steps encompassed with the broken line, a focus detecting action is immediately stopped if the action is being performed. If, at that time, the lens is being driven, the flow comes to a step 012 to send a signal to the lens unit FLNS to forcibly bring the lens to a stop. After that, the flow comes to steps 013 to 017 to carry out a release action.

At the step 013: The quick return mirror of the camera is moved upward. This is done by controlling a motor MTR2 through a driving circuit MDR2 by using motor control signals M2F and M2R. At the step 014: The aperture control value which has been stored by the "light measuring" subroutine at the step 005 is sent out to the lens FLNS to have the aperture controlled by the lens FLNS. At the step 015: A film is exposed to light by controlling the shutter in accordance with the shutter control value which has been also stored by the "light measuring" subroutine at the step 015. Upon completion of the shutter control, the flow comes to the step 016. At the step 016: The lens FLNS is instructed to fully open the aperture. At the step 017: The mirror is moved downward. Like in moving the mirror upward, the down-moving action on the mirror is performed by controlling the motor MTR2 with the motor control signals M2F and M2R.

After completion of the release action, the flow comes to a step 018 to wind the film. After film winding, the flow comes back to the step 002.

Next, the lens driving control operation is described with reference to FIG. 1 as follows: FIG. 1 is a flow chart showing the flow of operation performed within the lens FLNS for the steps 009 and 010 of the flow of program shown in FIG. 2. At a step 102: Data indicating the number of driving pulses (or a driving degree) FP is received from the camera along with a driving start instruction. At a step 103: The data of the degree of sensitivity S stored at the ROM within the microcomputer LPRS is read out. This is done in the following manner:

The microcomputer LPRS first detects the state of the zoom encoder ENCZ (2) shown in FIGS. 5 and 6 and thus obtains a zoom signal SENCZ. Next, the state of the focusing lens encoder ENCF (3) is detected to obtain a focus signal SENCF. Since the values of the degree of sensitivity S are stored in the ROM in a state of a matrix S=S (SENCZ, SENCF) with these signals used as parameters, a value of the degree of sensitivity S corresponding to the current signals SENCZ and SENCF is read out and used.

At a step 104: The value of the degree of sensitivity S read out at the step 103 is compared with a boundary value Scr set for determining the degree of the sensitivity. If the value of the degree of sensitivity S is equal to or larger than the boundary value Scr, the speed for the constant speed control area must be set at a low value. In this case, therefore, the flow comes to a step 105 to store a value "$\omega$low" for the constant-speed-control area speed $\omega$s. At the same time as this, a value "FPc" is stored for an overrun degree FPov after the brake application.

If the value of the degree of sensitivity S is found to be smaller than the boundary value Scr at the step 104, a higher speed is allowable for the constant speed control area. In that case, therefore, the flow comes to a step 106 to store a value "$\omega$mid" for the constant-speed-control area speed $\omega$s and, at the same time, to store a value "FPd" for the overrun degree FPov. Data for all the values of $\omega$low, $\omega$mid, FPc, FPd, etc., is stored in the ROM beforehand.

At a step 107: The value of the counter 6 and that of a timer disposed within the microcomputer LPRS are cleared. Steps 108 to 111 are provided for removal of back-lash. At the step 108: A very-low speed signal $\omega$BK for back-lash removal is stored for the setting speed $\omega$. At the step 109: The motor is started. The ensuing flow of operation is described on the assumption that the setting speed $\omega$(analog value) is supplied as a speed instruction signal from the microcomputer LPRS to the terminal 8a of the constant speed control circuit 8 (see FIG. 6).

In the event of any back-lash in the gear train, the counter 6 counts the pulse signal coming from the terminal 10a (see FIG. 6) and counts down the content of the counter from zero. When the pulses are no longer produced with the back-lash completely removed, the output 9b of the f/v conversion circuit 9 becomes zero. Therefore, the constant speed control circuit 8 produces from its terminal 8c an output indicating a value obtained by (a difference between outputs 8a and 8b)×(a given magnifying rate), i.e., (8a ×the magnifying rate). Since the signal applied to the terminal 8a is for the very low speed $\omega$BK, the terminal 8c outputs also a small signal. Therefore, a voltage output from the terminal 8c is usable only for rotating the motor or back-lash removal and is not useable for driving the focusing lens. Further, since the highest degree of the back-lash is approximately determinable by the arrangement of the gear train, the flow of program is arranged to proceed immediately to a next step when the amount of the pulses generated comes to exceed the upper limit value FPBK during the process of back-lash removal.

Since the back-lash removing action has begun at the step 109, a check is made at the next step 110 for the content of the counter 6. Since the counter 6 is arranged in this instance to count down, the content of the counter is a negative value during the process of the back-lash removing action. Therefore, if the content of the counter is equal to or larger than the upper limit number FPBK of the pulses generated, the back-lash can be deemed to have been completely removed. If so, therefore, the flow proceeds to a step 112. If not, the flow comes to the step 111. At the step 111: The upper limit length of time for back-lash removal is restricted. If the length of time having lapsed since the step 107 is less than a set value t0, the flow comes back to the step 110 to resume the back-lash removing action. When the timer value becomes equal to or larger than the set time t0, the flow shifts from the back-lash removing action to the normal lens driving action, which begins at the step 112.

At the step 112: A lens driving pulse number FP is stored at the counter 6. At a step 113: A check is made for the magnitude of the driving pulse number. If the content of the counter is above a decelerating section FPb shown in FIG. 3, the lens is to be driven at a high speed. If so, therefore, the flow comes to a step 114 to store the speed $\omega$max for the setting speed $\omega$. Then, a D/A-converted value of the setting speed $\omega$ is supplied to the terminal 8a in FIG. 6. Therefore, the speed of the motor LMTR is accelerated to drive the lens at the maximum speed $\omega$max. When the motor reaches the maximum speed $\omega$max the lens continues to be driven at the maximum speed.

When the content of the counter changes from the above-state value to a value less than the value of the decelerating section FPb, or in a case where the initial driving degree FP is less than FPb, the flow comes from the step 113 to a step 115. At the step 115: The speed value "ωs" is stored for "ω". In this instance, at the step 105, the speed ωs has been set at ωlow when the degree of sensitivity S is higher than the value Scr, and at ωmid when the degree of sensitivity S is lower than Scr. Therefore, the value "ωlow" or "ωmid" is stored for "ω" according to the degree of sensitivity S and, at the same time, this value is output from the terminal 8a. As a result, the motor LMTR is driven at the value ωlow or ωmid.

At a next step 116: The content of the counter is checked to find if it have become less than the overrun degree FPov. When the content of the counter becomes either equal to or less than the degree FPov, the flow proceeds to a step 117. At the step 117: The brake is applied to the motor LMTR. As a result, the lens overruns to a given degree to come to a stop just at a target position. Further, in this instance, the setting degree of the overrun FPov has been set at the step 105 in a one-to-one ratio to the constant-speed area speed ωs. In other words, the overrun degree is set at FPc which corresponds to the speed ωlow if the degree of sensitivity S is equal to or larger than Scr because the speed ωs is then set at ωlow. If the degree of sensitivity S is lower than Scr, the overrun degree FPov is set at FPd which corresponds to the speed ωmid as the speed value ωs is set at ωmid in that case.

At a step 118: The camera is informed of completion of lens driving and a series of lens driving steps comes to an end.

The flow described above can be summarized as follows: Referring to FIGS. 1 and 3, the lens FLNS first receives from the camera the driving pulses along with a driving instruction at the step 102. At the steps 103 to 106: The constant-speed driving area speed ωs and the setting overrun degree FPov are set, according to the degree of sensitivity S, respectively at "ðlow" and "FPc" or at "ωmid" and "FPd". At the steps 107 to 111: The backlash of the gear train is removed. At the steps 112 to 117: A normal lens driving action is performed. The driving pattern is determined by the speed ωs and the degree FPov which are set at the steps 103 to 106. The driving action is completed at the step 118.

In the case of the first embodiment described, the degree of sensitivity is divided into two including high and low degrees; and the driving speed for the constant-speed area into two rates including the speed ωlow and the speed ωmid. However, in a case where the lens has a large zoom ratio, the degree of sensitivity greatly varies. In that case, the driving speed must be more finely adjusted.

Therefore, in a second embodiment of this invention, the speed ωs for the constant-speed area and the predicted degree of overrun FPov resulting from the brake application at this speed are arranged to be defined as the functions of the degree of sensitivity S. The flow of operation of the second embodiment is shown in FIG. 7.

Figure 1:
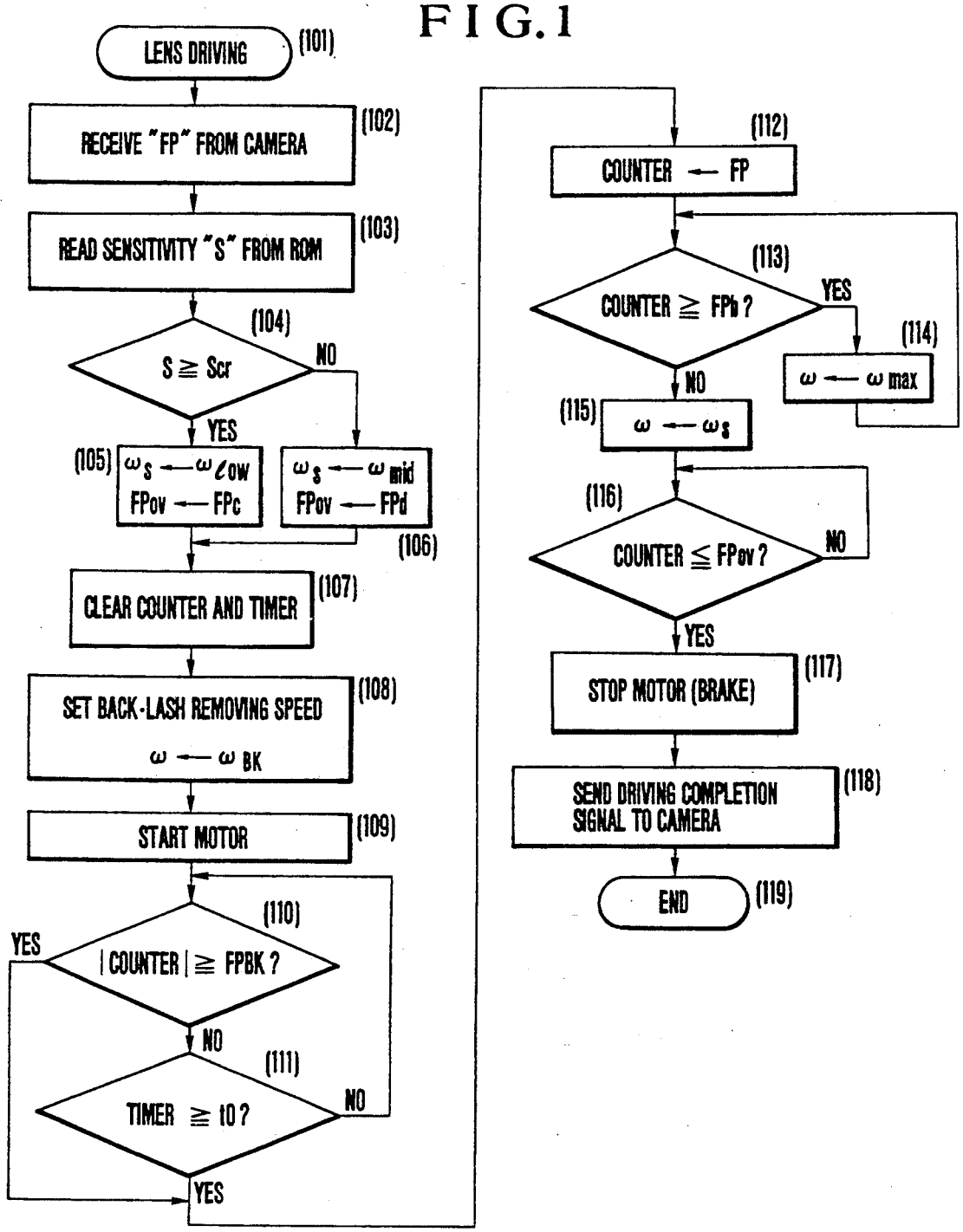
FIG. 1 is a flow chart showing the operation of an embodiment of this invention.
Figure 7:
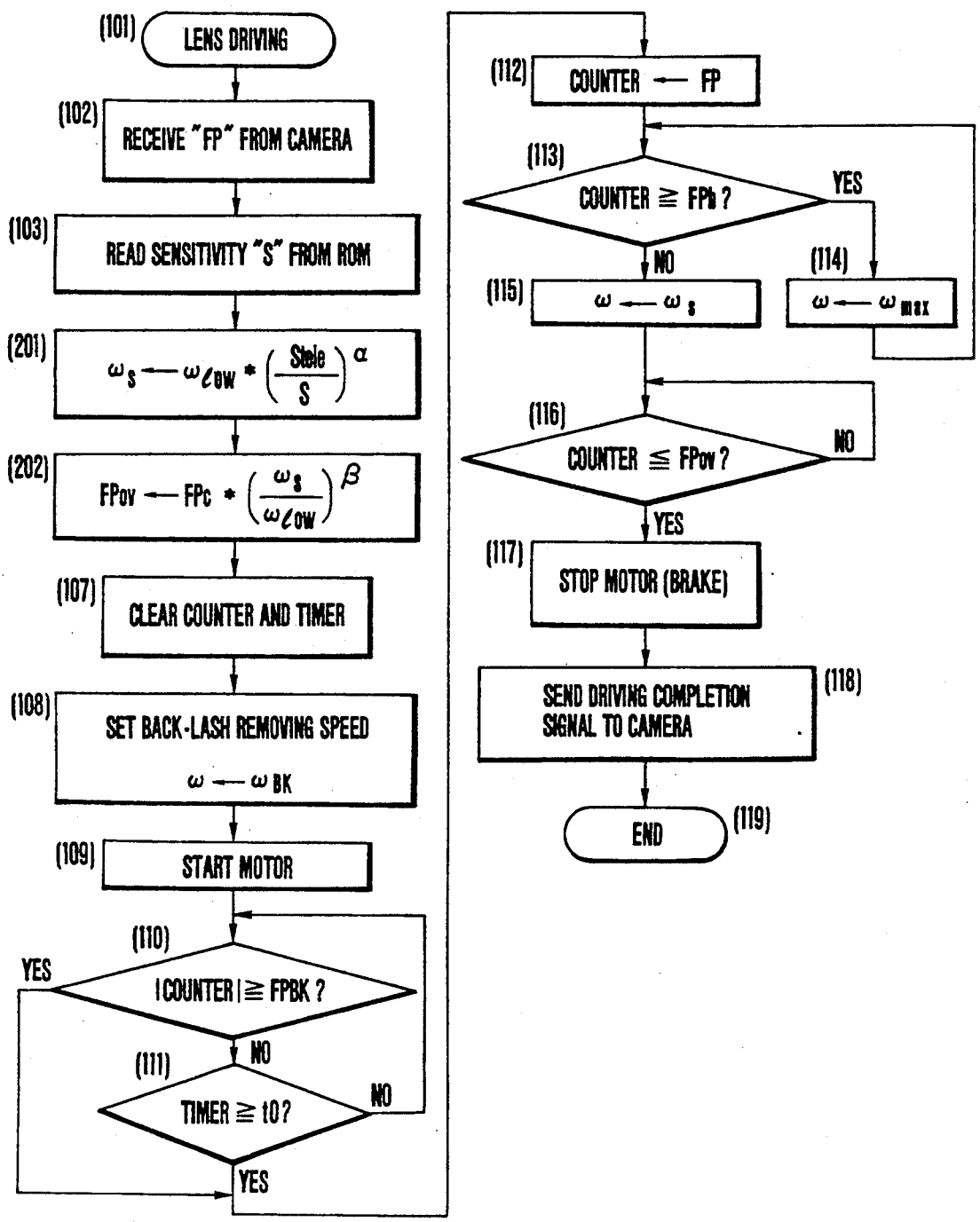
FIG. 7 is a flow chart showing the lens driving control operation of a second embodiment of the invention.

The flow of operation of the second embodiment differs from that of the first embodiment shown in FIG. 1 only in the part from the step 104 through the step 106. Therefore, other parts that perform the same actions as the first embodiment are indicated by the same step numbers as in FIG. 1 and the following description covers only the different part:

Referring to FIG. 7, when the degree of sensitivity S is read out from the ROM at the step 103, the speed ωs for the constant-speed area is computed at a step 201 in the following manner: As mentioned in the foregoing, the various characteristics of the driving system are designed on the basis of values obtained at the telephoto end where the degree of sensitivity S is high. Therefore, the speed ωs is also computed on the basis of the value obtained at the telephoto end. Assuming that the standard values of the speed ω and the degree of sensitivity S are set at a value ωlow and a value "Stele" obtained at the telephoto end respectively, the value ωs can be defined by the following formula:

$$\omega s = \omega low * (Stele/S)^\alpha$$

wherein α represents a constant. If α=1, the speed value ωs is set at a value inversely proportional to the degree of the sensitivity. Further, since the degree of sensitivity is proportional to the square of the focal length, if the constant α is set at ½, the value ωs becomes inversely proportional to the focal length. If the constant α is zero, the speed value ωs becomes ωlow (a constant speed). Therefore, if the constant α is close to "1", the characteristic of control on the wide-angle side gives priority to a shorter driving time. If the constant α is close to "0", the stopping accuracy has priority. Therefore, the constant α is set at a suitable value between "0" and "1".

At a next step 202: The overrun degree FPov is computed in accordance with the following formula on the basis of the speed ωlow and the overrun degree FPc obtained at the telephoto end:

$$FPov = FPc * (\omega s/\omega low)^\beta$$

wherein "β" also represents a constant. The constant β is determined on the basis of the above-stated speed and the result of a test conducted for the overrun degree by applying the brake at that speed. Further, the value of the constant β is normally between "1" and "2".

After the speed ms and the overrun degree FPov have been determined through the steps 201 and 202, the steps 107 to 111 are executed to remove the backlash and the steps 112 to 117 to perform the normal driving action in the same manner as in the case of the first embodiment.

In the second embodiment, as described above, the speed ωs is finely set according to the degree of sensitivity S. Therefore, in executing the steps 112 to 117 for the constant-speed driving control, the lens can be driven always at an optimum speed.

In a case where the lens is of the front-lens focusing type, the degree of sensitivity S does not much vary when the position of the focusing lens varies. Whereas, in cases where the lens is of the inner focus type or the rear focus type, the degree of sensitivity S varies to a greater degree accordingly as the focusing lens position varies. The degree of sensitivity S, therefore, varies every moment and the optimum value of the speed ωs also varies accordingly while the focusing lens is driven. However, since the first and second embodiments are arranged to determine the speed ωs on the basis of the degree of sensitivity prior to the start of driving, the speed ωs is not always apposite immediately before bringing the lens to a stop in the event of a large driving degree.

A third embodiment of the invention is, therefore, arranged to determine the speed ωs by monitoring the degree of sensitivity S during the process of lens driving, so that the lens driving speed can be always at an optimum value even in the case of an inner focus type lens. The flow of operation of the third embodiment is shown in FIG. 8. In FIG. 8 which is a flow chart, steps for the same actions as those of the second embodiment shown in FIG. 7 are indicated by the same step numbers. All these same parts of the flow of operation are omitted from the following description.

When the lens driving degree FP is received from the camera at the step 102, a backlash removing action is immediately performed at steps 107 to 112.

If the driving degree is found to be large through the ensuing steps 112 to 114, the lens is driven at the maximum speed $\omega max$. When the content of the counter is found to be less than the driving degree FPb at the step 113, the flow comes to a step 301 for the constant-speed driving control. At the step 301, a sensitivity storing area So is cleared by substituting "0". At a next step 302, the degree of sensitivity S is read out from the ROM. Since, the lens driving action is in process then, a value of degree of sensitivity S determined by signals SENCZ and SENCF obtained at that time is of course read out.

At a step 303: The value of the degree of sensitivity S read out at the step 302 is compared with the value So of the sensitivity storing area. However, at the time when the step 303 is to be executed, the value So has been set at "0" through the step 301. Therefore, the value S is of course larger than the value So. The flow proceeds to a step 304. The step 304 is identical with the step 201 of the second embodiment. Therefore, at the step 304, the speed $\omega s$ of the constant speed area is computed. The computed speed value is supplied to the constant speed control circuit 8. The speed control is then performed to have the motor LMTR driven at the $\omega s$. At a next step 305 which is identical with the step 202, the overrun degree FPov is computed. At a step 306: The value of the degree of sensitivity S which is read out at the step 302 and obtained at this point of time is stored in the storing area So.

At the step 116 which follows the step 306: The counter is checked to find if its content has become equal to or less than the overrun degree FPov. In other words, it is checked to find if the lens position has come to the point of brake application. If so, the flow comes to the step 117 to apply the brake. If not, the flow comes back to the step 302 to continue driving at the speed $\omega s$.

With the flow coming back to the step 302 to again read out the degree of sensitivity S, when the flow comes to the step 303, the value of the degree of sensitivity S previously read out at the step 302 is stored in the storing area So. Therefore, if the currently read out of the degree of sensitivity value S is the same as the previously read out value S, the flow comes from the step 303 to the step 116 to have the lens driven continuously at the same speed $\omega s$.

If the current degree of sensitivity S is found to be higher than the previous value S, i.e., if the degree of sensitivity S has been increased by driving the focusing lens, the speed $\omega s$ must be changed to a lower value. If not, it is impossible to ensure an adequate degree of the stopping accuracy on the focal plane. In this instance, therefore, the driving speed $\omega s$ and the overrun degree FPov are newly computed at steps 304 and 305 for changing the speed. At the step 306, the degree of sensitivity S newly obtained is stored in the storing area So.

In a case where the current degree of sensitivity S is found to be lower than the previous value S at the step 303, the speed $\omega s$ may be increased. However, this means a repeated acceleration to a slight degree after deceleration from the maximum speed $\omega max$ to the speed $\omega s$ and is undesirable to a photographer. In the case of the third embodiment, therefore, the flow is arranged to come to the step 116 without changing the speed.

After driving the lens by setting the optimum speed according to the degree of sensitivity S, the lens driving action is completed through the steps 117 and 118.

The third embodiment is thus arranged to drive the lens at the optimum speed while monitoring the degree of sensitivity S during the process of lens driving. Therefore, the lens driving action can be controlled to have the driving time appositely balanced with the driving accuracy even when the sensitivity varies during the lens driving process as in the case of an inner focus type focusing lens.

Further, in the event of occurrence of such a change in the degree of sensitivity that requires an increase in the speed $\omega s$ while the lens is driven at the speed $\omega s$, the third embodiment inhibits the speed $\omega s$ from being changed. This effectively prevents a disagreeable impression on the photographer.

In the cases of the first, second and third embodiments described, the motor LMTR which is employed as a drive source and the control circuit LCNT are disposed within the lens (unit). However, this of course may be changed to have them disposed within the camera (body) to have only the ROM disposed within the lens.

The embodiment is arranged to perform the speed control in accordance with the degree of sensitivity of the focusing lens. This enables the lens driving control to always have the driving time adequately balanced with the stopping accuracy on the focal plane.

As described in the foregoing, the embodiment comprises first speed setting means for setting a first speed which always includes a maximum speed whenever the maximum speed can be set for moving the focusing lens over a long distance within a short period of time; and second speed setting means for setting a second speed for bringing the focusing lens to a stop with a given degree of accuracy in accordance with information on the degree of sensitivity read out from sensitivity storing means. Therefore, the first speed is set whenever the maximum speed can be set. Further, since the second speed is arranged to be determined always taking the degree of sensitivity into consideration, the driving control can be accomplished to have the driving time always well balanced with the stopping accuracy even in the event of a great change in the degree of degree of sensitivity.

While the embodiment described is arranged to have the focus adjusting motor LMTR disposed within the lens, this motor may be disposed within the camera body and the focusing lens may be moved within the lens unit through a suitable transmission arrangement.

The optical system of the embodiment described is of a type wherein the degree of sensitivity thereof varies even with changes in the position of the focusing lens. In the case of the optical system called the inner focus type or rear focus type, the degree of sensitivity varies with the position of the focusing lens included therein. Therefore, the degree of sensitivity is changed by a change in the position of the focusing lens even when no zooming action is performed. In such a case, therefore, the speed of the motor is also changed. Further, in the cases of the embodiment described, the lens driving speed is arranged to be changed in the constant-speed control area in changing the motor speed according to the change of the degree of sensitivity caused by a change in the position of the focusing lens. However, the driving speed may be arranged to be somewhat lowered even within the high-speed driving area from a speed employed for a low degree of sensitivity when the degree of sensitivity becomes higher. The higher degree of sensitivity gives a greater shifting degree on the image plane for a given focusing lens shifting degree. Such arrangement effectively makes the image shifting speed constant as observed on the view finder of the camera. In this instance, the time required for focusing is not much increased, because the degree of sensitivity varies to a much lesser degree than in the case of zooming.

What is claimed is:

1. An optical apparatus comprising:
   a) an optical system including at least a focusing lens;
   b) driving means for driving said focusing lens;
   c) computing means for obtaining sensitivity information concerned with an amount of movement of the position of an image forming plane relative to a predetermined driving degree of said focusing lens;
   d) focus detecting means; and
   e) control means for causing said driving means to drive said focusing lens at a first speed and, after that, at a second speed which is lower than said first speed and, then, stop said focusing lens, on the basis of focus information obtained by said focus detecting means and said sensitivity information obtained by said computing means, said control means being arranged to vary said second speed according to said sensitivity information.

2. An optical apparatus according to claim 1, wherein said optical system includes a zoom lens, and wherein the amount of movement of the position of the image forming plane relative to the predetermined driving degree of said focusing lens varies according to a change of the focal length caused by the movement of said zoom lens.

3. An optical apparatus according to claim 1, wherein the amount of movement of the position of the image forming plane relative to the predetermined driving degree of said focusing lens varies according to a change of the position of said focusing lens.

4. An optical apparatus according to claim 1, wherein an area in which said focusing lens is to be driven at said first speed is determined by an amount of movement of said focusing lens required for in-focus which is obtained from an amount of defocus detected by said focus detecting means and said sensitivity information.

5. An optical apparatus according to claim 1, wherein said computing means is arranged to obtain said sensitivity information before said focusing lens is driven.

6. An optical apparatus according to claim 1, wherein said computing means is arranged to obtain said sensitivity information during the process of driving said focusing lens.

7. An optical apparatus according to claim 1, wherein said optical system includes a zoom lens, and wherein the amount of movement of the position of the image forming plane relative to the predetermined driving degree of said focusing lens varies according to a change of the focal length caused by the movement of said zoom lens and a change of the position of said focusing lens.

8. An optical apparatus according to claim 2, wherein the movement of said zoom lens is detected by position detecting means, and wherein said sensitivity information is obtained on the basis of information on the position of said zoom lens detected by said position detecting means.

9. An optical apparatus according to claim 6, wherein an area in which said focusing lens is to be driven at said first speed is determined by an amount of movement of said focusing lens required for in-focus which is obtained from an amount of defocus detected by said focus detecting means and said sensitivity information.

10. An optical apparatus according to claim 8, wherein an area in which said focusing lens is to be driven at said first speed is determined by an amount of movement of said focusing lens required for in-focus which is obtained from an amount of defocus detected by said focus detecting means and said sensitivity information.

11. An optical apparatus comprising:
   a) an optical system including at least a focusing lens;
   b) driving means for driving said focusing lens;
   c) computing means for obtaining sensitivity information concerned with an amount of movement of the position of an image forming plane relative to a predetermined driving degree of said focusing lens;
   d) focus detecting means;
   e) control means for causing said driving means to drive said focusing lens at a first speed and, after that, at a second speed which is lower than said first speed and, then, stop said focusing lens, on the basis of focus information obtained by said focus lens, on the basis of focus information obtained by said focus detecting means and said sensitivity information obtained by said computing means, said control means being arranged to vary said second speed according to said sensitivity information; and
   f) wherein the amount of movement of the position of the image forming plane relative to the predetermined driving degree of said focusing lens varies according to a change of the position of said focusing lens, the movement of said focusing lens is detected by position detecting means, and wherein said sensitivity information is obtained on the basis of information on the position of said focusing lens detected by said position detecting means.

12. An optical apparatus according to claim 11, wherein an area in which said focusing lens is to be driven at said first speed is determined by an amount of movement of said focusing lens required for in-focus which is obtained from an amount of defocus detected by said focus detecting means and said sensitivity information.

13. An optical apparatus comprising:
   a) an optical system having a degree of sensitivity which varies according to the movement of a specific lens in the direction of an optical axis thereof;
   b) driving means for driving a focusing lens;
   c) computing means for obtaining said degree of sensitivity of said optical system;
   d) focus detecting means; and
   e) control means for controlling a driving speed of said focusing lens driven by said driving means on the basis of focus information detected by said focus detecting means and said sensitivity degree obtained by said computing means, said control means being arranged to cause said driving means to drive said focusing lens at a first speed and, after that, at a second speed which is lower than said first speed and, then, stop said focusing lens, said control means being arranged to vary said second speed according to said sensitivity degree.

14. An optical apparatus according to claim 13, wherein said specific lens is a zoom lens.

15. An optical apparatus according to claim 13, wherein said specific lens is said focusing lens.

16. An optical apparatus according to claim 13, wherein an area in which said focusing lens is to be driven at said first speed is determined by an amount of movement of said focusing lens required for in-focus which is obtained from an amount of defocus detected by said focus detecting means and said sensitivity degree.

17. An optical apparatus according to claim 13, wherein said commuting means is arranged to obtain said sensitivity degree before said focusing lens is driven.

18. An optical apparatus comprising:
a) an optical system having a degree of sensitivity which varies according to the movement of a specific lens in the direction of an optical axis thereof;
b) driving means for driving a focusing lens;
c) computing means for obtaining said degree of sensitivity of said optical system, said computing means being arranged to obtain said sensitivity degree during the process of driving said focusing lens;
d) focus detecting means; and
e) control means for controlling a driving speed of said focusing lens driven by said driving means on the basis of focus information detected by said focus detecting means and said sensitivity degree obtained by said computing means, said control means being arranged to cause said driving means to drive said focusing lens at a first speed and, after that, at a second speed which is lower than said first speed and, then, stop said focusing lens, said control means being arranged to vary said second speed according to said sensitivity degree.

19. An optical apparatus according to claim 18, wherein an area in which said focusing lens is to be driven at said first speed is determined by an amount of movement of said focusing lens required for in-focus which is obtained from an amount of defocus detected by said focus detecting means and said sensitivity information.

20. An optical apparatus comprising:
a) an optical system having a degree of sensitivity which varies according to the movement of a specific lens in the direction of an optical axis thereof;
b) driving means for driving a focusing lens;
c) computing means for obtaining said degree of sensitivity of said optical system;
d) focus detecting means;
e) control means for controlling a driving speed of said focusing lens driven by said driving means on the basis of focus information detected by said focus detecting means and said sensitivity degree obtained by said computing means, said control means being arranged to cause said driving means to drive said focusing lens at a first speed and, after that, at a second speed which is lower than said first speed and, then, stop said focusing lens, said control means being arranged to vary said second speed according to said sensitivity degree; and
f) wherein the movement of said specific lens is detected by position detecting means, and wherein said sensitivity degree is obtained on the basis of information on the position of said specific lens detected by said position detecting means.

21. An optical apparatus according to claim 20, wherein an area in which said focusing lens is to be driven at said first speed is determined by an amount of movement of said focusing lens required for in-focus which is obtained from an amount of defocus detected by said focus detecting means and said sensitivity information.

22. An optical apparatus comprising:
a) an optical system including a focusing lens which is located behind a lens disposed at a fore end of an optical axis of said optical system;
b) driving means for driving said focusing lens;
c) first computing means for obtaining sensitivity information concerned with an amount of movement of the position of an image forming plane relative to a predetermined driving degree of said focusing lens which is determined on the basis of the position of said focusing lens;
d) focus detecting means;
e) second computing means for determining a driving speed of said driving means, said second computing means being arranged to determine said driving speed on the basis of said sensitivity information obtained by said first computing means; and
f) control means for controlling said driving means according to said driving speed.

23. An optical apparatus according to claim 20, wherein said first computing means is arranged to obtain said sensitivity information before said focusing lens is driven.

24. An optical apparatus comprising:
a) an optical system including a focusing lens which is located behind a lens disposed at a fore end of an optical axis of said optical system;
b) driving means for driving said focusing lens;
c) first computing means for obtaining sensitivity information concerned with an amount of movement of the position of an image forming plane relative to a predetermined driving degree of said focusing lens which is determined on the basis of the position of said focusing lens, said first computing means being arranged to obtain said sensitivity information during the process of driving said focusing lens;
d) focus detecting means;
e) second computing means for determining a driving speed of said driving means, said second computing means being arranged to determine said driving speed on the basis of said sensitivity information obtained by said first computing means; and
f) control means for controlling said driving means according to said driving speed.

25. An optical apparatus according to claim 24, wherein an area in which said focusing lens is to be driven at said first speed is determined by an amount of movement of said focusing lens required for in-focus which is obtained from an amount of defocus detected by said focus detecting means and said sensitivity information.

26. An optical apparatus comprising:
a) an optical system including a focusing lens which is located behind a lens disposed at a fore end of an optical axis of said optical system;

b) driving means for driving said focusing lens;
c) first computing means for obtaining sensitivity information concerned with an amount of movement of the position of an image forming plane relative to a predetermined driving degree of said focusing lens which is determined on the basis of the position of said focusing lens which is determined on the basis of the position of said focusing lens;
d) focus detecting means;
e) second computing means for determining a driving speed of said driving means, said second computing means being arranged to determine said driving speed on the basis of said sensitivity information obtained by said first computing means;
f) control means for controlling said driving means according to said driving speed; and wherein the movement of said focusing lens is detected by position detecting means, and wherein said sensitivity information is obtained on the basis of information on the position of said focusing lens detected by said position detecting means.

27. An optical apparatus according to claim 26, wherein an area in which said focusing lens is to be driven at said first speed is determined by an amount of movement of said focusing lens required for in-focus which is obtained from an amount of defocus detected by said focus detecting means and said sensitivity information.

28. An optical apparatus comprising:
a) an optical system including at least a focusing lens;
b) driving means for driving said focusing lens;
c) computing means for obtaining sensitivity information concerned with an amount of movement of the position of an image forming plane relative to a predetermined driving degree of said focusing lens, the amount of movement of the position of the image forming plane relative to the predetermined driving degree of said focusing lens varies according to a change of the position of said focusing lens;
d) focus detecting means; and
e) control means for causing said driving means to drive said focusing lens at a specific speed and, then, stop said focusing lens, on the basis of focus information obtained by said focus detecting means and said sensitivity information obtained by said computing means, said control means being arranged to vary said specific speed according to said sensitivity information.

29. An optical apparatus according to claim 28, wherein an area in which said focusing lens is to be driven at said first speed is determined by an amount of movement of said focusing lens required for in-focus which is obtained from an amount of defocus detected by said focus detecting means and said sensitivity information.

30. An optical apparatus according to claim 28, wherein said computing means is arranged to obtain said sensitivity information before said focusing lens is driven.

31. An optical apparatus according to claim 28, wherein said computing means is arranged to obtain said sensitivity information before said focusing lens is driven.

32. An optical apparatus according to claim 28, wherein said optical system includes a zoom lens, and wherein the amount of movement of the position of the image forming plane relative to the predetermined driving degree of said focusing lens varies according to a change of the focal length caused by the movement of said zoom lens and a change of the position of said focusing lens.

33. An optical apparatus according to claim 28, wherein the movement of said focusing lens is detected by position detecting means, and wherein said sensitivity information is obtained on the basis of information on the position of said focusing lens detected by said position detecting means.

* * * * *

UNITED STATES PATENT AND TRADEMARK OFFICE
CERTIFICATE OF CORRECTION

PATENT NO. : 5,206,677
DATED : April 27, 1993
INVENTOR(S) : Ichiro Onuki and Tatsuo Chigira It is certified that error appears in the above-identified patent and that said Letters Patent is hereby corrected as shown below:

```
Col.  1, line 67.    Change "range." to -- range, --
Col.  1, line 67.    Change "The" to -- the --
Col.  2, line 22.    Change "irrespectively" to -- irrespective --
Col.  2, line 46.    Change "pulse" to -- plus --
Col.  3, line 67.    Change "irrespectively" to -- irrespective --
Col.  4, line  5.    Delete ","
Col.  4, line  6.    After "uniform" insert -- , --
Col.  6, line 35.    Change "14 and 15" to -- I4 and I5 --
Col. 12, line 27.    Change "from" to -- form --
Col. 14, line 27.    Change "or" to -- for --
Col. 14, line 28.    Change "useable" to -- usable --
Col. 15, line 14.    Change "have" to -- has --
Col. 20, lines 31-33. Delete "on the basis of focus
                      information obtained by said focus lens--

Col. 21, line 17.    Change "commuting" to -- computing --
Col. 22, line 32.    Change "20" to -- 22 --
Col. 23, lines 6 and 7. Delete "which is determined on the
                        basis of the position of said
                        focusing lens"
```

UNITED STATES PATENT AND TRADEMARK OFFICE
CERTIFICATE OF CORRECTION

PATENT NO.   :  5,206,677
DATED        :  April 27, 1993
INVENTOR(S)  :  Ichiro Onuki, et al It is certified that error appears in the above-indentified patent and that said Letters Patent is hereby corrected as shown below:

Column 24, lines 25 and 26, delete "before said focusing lens is driven" and insert --during the process of driving said focusing lens.--

Signed and Sealed this

Eighth Day of February, 1994

Attest:

BRUCE LEHMAN

Attesting Officer

Commissioner of Patents and Trademarks